Jan. 13, 1948.  P. J. ELIOMARKAKIS  2,434,551
MAGNETIC FUSE
Filed Aug. 11, 1943
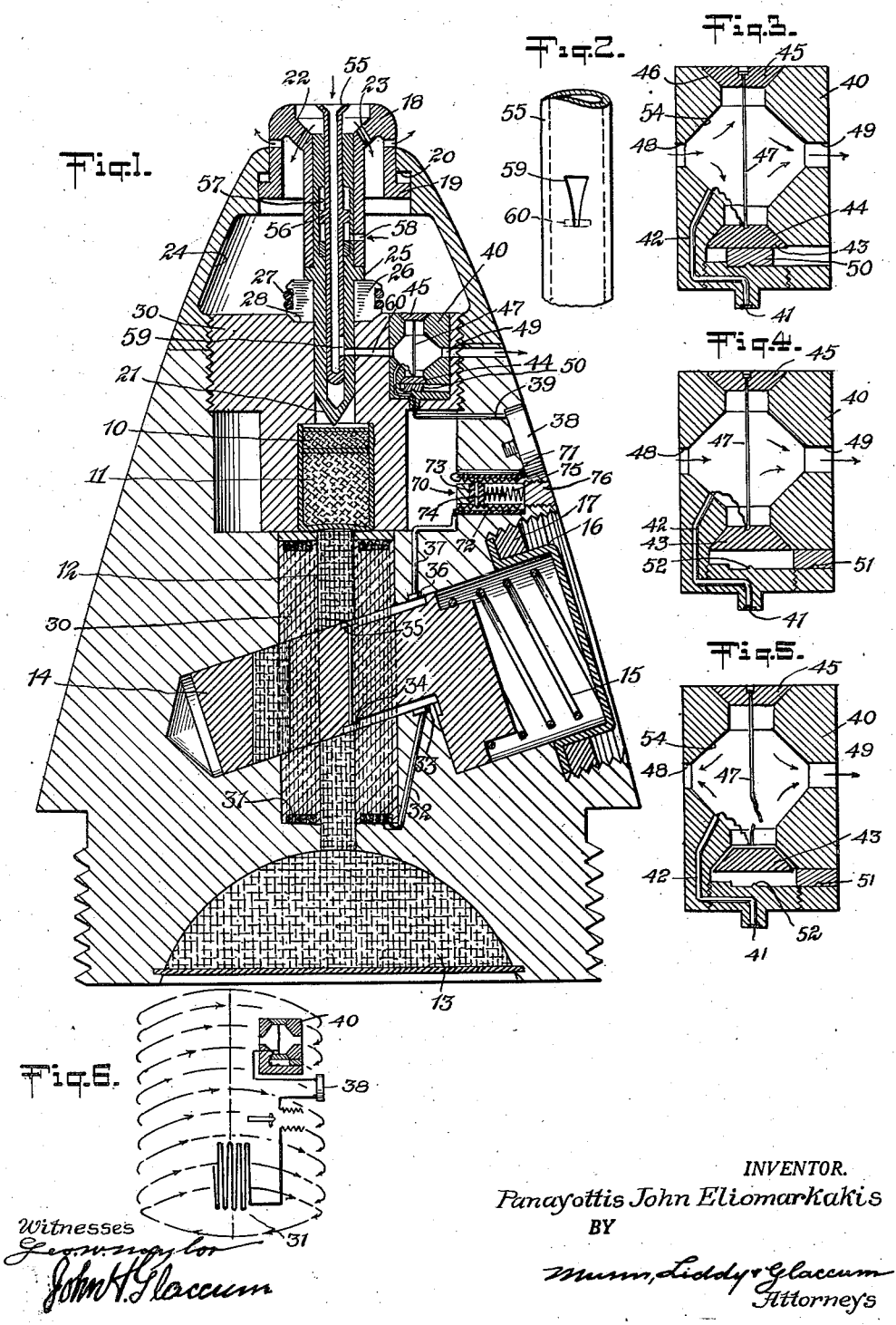
INVENTOR.
Panayottis John Eliomarkakis
BY
Munn, Liddy & Glaccum
Attorneys Patented Jan. 13, 1948

2,434,551

UNITED STATES PATENT OFFICE 2,434,551

MAGNETIC FUSE

Panayottis John Eliomarkakis, Philadelphia, Pa.

Application August 11, 1943, Serial No. 498,142

2 Claims. (Cl. 102—70)

This invention relates to a control mechanism and more particularly to a control operated by the variations of magnetic fields. For the purposes of illustration and disclosure, I have shown my control adapted for use in a projectile. It is equally applicable to many other uses where a coil may be rotated through magnetic fields and where the variation in magnetic fields will be available to operate the control. Controls might be used for many purposes such as for safety devices and warnings used to warn of the approach of large bodies.

As is well known, the earth is a large magnet in which the magnetic poles do not coincide with the corresponding geographical poles. The magnetic lines of the earth's magnetic field are curves which originate in the north magnetic pole and terminate in the south magnetic pole. The curvature of these is indicated by the angle of the magnetic declination in any locality. The intensity of the earth's magnetic field is not constant and changes with magnetic latitude from a minimum at the magnetic Equator (0.281 Gauss) to a maximum at the magnetic poles (from 0.613-0.714 Gauss) similarly the intensity decreases proportional to the cube of the altitude above the earth's surface. However, for our purposes involving a relatively short distance from the earth and relatively small areas, the differences are so slight that the earth's magnetic field may be considered as homogeneous for any given elevation above the earth's surface and the dynamic magnetic lines may be considered as being straight parallel lines running in the direction of magnetic north.

It is also well known that such objects as ships, planes and other objects are magnetized to a degree and have a magnetic field about their bodies with varying lines of force.

It is also well known from electric magnetic theory that if a ring of soft iron is placed in a magnetic field the magnetic dynamic lines following the route of least resistance will pass through the ring and will come out at the other end with only a few of them coming through the center of the ring. The ring will be magnetized, and, if we turn it, the position of its poles will not be changed relative to the direction of the magnetic lines. Simultaneously, there will be a condensation of these dynamic lines in the ring. It is likewise well known that a conductor in the form of a coil rotated through a magnetic field will become magnetized at a magnetic intensity stronger than the one which it had while it was at rest and a current will be generated in its ends. It follows that if the coil finds itself subjected to the influence of an additional magnetic field, it will produce an alternation voltage depending upon the intensity of the new magnetic field and distance from the original field.

The tensile strength of certain metals fails rapidly with the rise in temperature. For instance manganese bronze has a tensile strength in pounds per square inch of 21,450 at 600° F. but at 750° F. it has only a tensile strength of 7,350 pounds per sq. inch. Zinc has a tensile strength of 3,200 at 250° C. and of only 400 at 300° C.

As previously stated, my invention has many applications but for the purpose of disclosure and description, I will discuss its use in connection with a projectile and more particularly an automatic electrical fuse controlled by a variation of the magnetic field in which the projectile travels.

A primary object of my invention is to provide a control unit in which the temperature of a metallic wire may be increased by a variation in magnetic fields with the resultant lessened tensile strength of said wire producing an elongation or rupture thereof.

A further object is the adaptation of such a unit to instruments or machines where a complete entirely accurate measurement or control may result.

Fig. 1 is a cross sectional elevation of a supersensitive fuse embodying my invention.

Fig. 2 is a detailed view of a control thereof.

Figs. 3, 4, and 5 are successive views of a portion of my control element.

Fig. 6 is a diagrammatic view of a circuit embodying my invention.

The fuse shown in the drawings is of the supersensitive type described and discussed on page 588 of Hayes' "Elements of Ordnance."

In the shell a primer 10 and a detonator 11 connect with a powder train 12 leading to a booster charge 13. The powder train 12 is broken by an interrupter 14 normally held out of position by the interrupter spring 15 held in position by a thimble 16 and a thimble nut 17.

In the forward part of the shell is a striker head 18 provided with an annular flange 19 which may engage the wall 20 in the nose of the projectile. It will be seen that the striker head is free to move somewhat and that it carries the firing pin 21. The striker head 18 is provided with a depression 22 in which are a plurality of ports 23 leading into the cavity 24. The firing pin is provided with flanges 25 and is normally kept away from the primer by a locking element 26 which consists of sectors of a brass cylinder arranged around the shaft of the firing pin and held together by light split rings 27. The locking element 26 is positioned in a seat 28. It will be seen that while the shell is at rest it cannot be discharged due to the position of the firing pin and the striker head and the position of the locking element 26 seated in the recess 28 in the carrier 30.

As a further safety element the interupter breaks the powder train to prevent an explosion of the shell should the detonator accidentally be set off. All of the foregoing features are conventional and are more clearly described and explained in ordnance books, notably Hayes' "Elements of Ordnance," page 588.

When the shell is in the bore of the gun, linear acceleration causes the locking element 26 to hug the seat 28 and because of the angle of its position causes the interrupter 14 to overcome any tendency of centrifugal force to move it outwardly against the interrupter spring. As soon as the projectile leaves the barrel of the gun and linear acceleration ceases, the sectors of the locking element 26 fly outwardly due to centrifugal force and the firing pin is free to contact the primer. At the same time upon the cessation of linear acceleration, centrifugal force overcomes the friction caused by the angular position of the interrupter and the interrupter moves outwardly against the interrupter spring to complete the powder train.

The air pressure on the nose of the projectile is very great and tends to drive the striker head to the rear and the firing pin into the primer. However, as soon as the projectile begins to move out air is forced through the ports 23 into the chamber 24 and since the cross diameter of the interior of the striker head is greater than the diameter of the outer portion, the striker head is held in position by the air pressure within the chamber. Consequently during the flight of the projectile the striker head and the firing pin remain in their forward positions. As soon as the projectile comes into contact with any object of sufficient strength to cut off the flow of air through the ports 23, pressure in the cavity 24 is cut off and the striker head 18 and firing pin 21 are driven to the rear thus exploding the shell. It will be appreciated that very little resistance is necessary since the shell may be exploded after firing by releasing the air in the chamber 24.

In adapting my invention to the particular type of fuse heretofore described, I provide a soft iron core 30 which must necessarily have an opening therein to allow the interrupter 14 to pass therethrough. On the core 30 is mounted a coil 31 from which a wire 32 leads to a slide contact 33 adapted to engage contact 34 on the interrupter 14. A similar contact 35 on the interrupter engages a contact 36 on the lead 37. Lead 37 passes through the variable resistance 38, the purpose of which will be discussed further, to the lead 39 into the control element 40. For the purpose of expediency, control element 40 may be constructed as a separate unit although if desired it could be built into the shell carrier 30. The element 40 is provided with a contact point 41 and with a lead 42 which connects to the plug 43 which is constructed in the shape of a truncated cone adapted to fit within the seat 44. A similar plug 45 is positioned within the seat 46 and is connected to the plug 43 by means of a metallic wire 47.

The wire 47 is constructed of a metal whose tensile strength falls rapidly with a rise in temperature and may be made of any number of metals such as Crane's Hard Metal, Crane's Steam Metal, manganese bronze, or zinc. On either side of the unit 40 are orifices 48 and 49 and below the plug 43 is a safety plug 50 having an indentation 51 adapted to engage the point 52.

Through the center of the striking head in the firing pin, I provide a hollow tube member 55 which acts as a control. Hollow tube member 55 is provided with flanges 56 within the chamber 57 and an opening 58 leads from the chamber 24 into the chamber 57. Control 55 has an opening therein 59 which opening is narrower at the bottom thereof than at the top and is adapted to allow air to pass through the channel 60 through the orifice 48 into the chamber 54 of the control unit. It will be seen that by moving the control 55 forward and rearwardly within the striker head the amount of air passing through the control unit 40 may be regulated.

Referring to the safety plug 50, it will be seen that it will normally be held in place through the point 52 and the indentation 51 and that as long as the shell has linear acceleration, it will maintain this position. However, when linear acceleration ceases centrifugal force will move the plug 50 outwardly as shown in Fig. 4 so that it no longer supports plug 43.

It will be seen that I have superimposed an electrical circuit upon a projectile traveling and rotating in the magnetic field of the earth which will induce a current in that circuit capable of raising the temperature of the metal wire 47 from its normal temperature ($T_1$) to an increased temperature ($T_2$). In order to maintain the desired temperature $T_2$ while the projectile is in flight, a forced convective heat loss is necessary. This is provided by the control 55 which allows air to pass through the control through the opening 59 therein, through the orifice 48 into the chamber 54 over the wire 47 and out through the orifice 49 and its connecting channel. While the control 55 is slidable within the striker head of the firing pin, once it is set the air pressure entering in through the channel 58 operating against the flanges 56 will hold it in place.

The amount of air necessary to maintain the desired temperature can be accurately figured by existing and known formulae and the temperature of the metal wire will remain constant during the time which the projectile moves through a steady magnetic field. However if the projectile moves through a resultant magnetic field the component parts of which are the earth's magnetic field on which is superimposed a magnetic force such as that of a ship or airplane a resultant magnetic force is created which is higher than the earth's magnetic field and a greater current will be generated in the circuit which will be proportional to the strength of the resultant magnetic field. As a result a temperature $T_3$ will be generated in the metal wire 47. The increases in the magnetic field will be greater than that of the earth's normal magnetic field in the following relations, taking for example a plane:

| Earth's Magnetic Field Intensity Gauss | Plane's Magnetic Field Gauss | Percentage Increase in Resultant Field | Estimated Temperature Increase in Wire |
|---|---|---|---|
|  |  | Per cent | Per cent |
| 0.4 | 0.01 | 2.5 | 5.06 |
| 0.4 | 0.02 | 5.0 | 10.25 |
| 0.4 | 0.03 | 7.5 | 15.56 |
| 0.4 | 0.04 | 10 | 21 |
| 0.4 | 0.05 | 12.5 | 26.5 |
| 0.4 | 0.1 | 25 | 56.25 |

Having, however, all the above in mind, we consider a metal whose tensile strength falls rapidly with the rise in temperature, then we have for the following such metals:

|  | Temperature | Tensile Strength lbs. per inch squared |
|---|---|---|
| Crane's Hard Metal | 950° F | 10,825 |
|  | 1,000° F | 5,710 |
| Crane's Steam Metal | 500° F | 20,260 |
|  | 550° F | 12,230 |
| Manganese Bronze | 600° F | 21,450 |
|  | 750° F | 7,350 |
| Zinc | 250° C | 3,200 |
|  | 300° C | 400 |

It will be seen therefore that after the projectile has been fired and the safety devices, including the element 26 and the interrupter 14, have been moved out of the safety position by centrifugal force upon cessation of the linear acceleration, the plug 50 is likewise moved out from under the plug 43, tension will be exercised on the wire 47 due to the tendency of both plugs 45 and 43 to move outwardly. Should the projectile come in contact with the target, it will of course explode. Assuming that it passes some distance from the target but through the magnetic field created by the target, the additional current set up by the magnetic field will raise the temperature of the wire 47 from the predetermined flight temperature $T_2$ to a considerably higher temperature $T_3$ which will reduce the tensile strength of the wire to the breaking point. Wire 47 will then rupture as shown in Fig. 5 and the plug 45 will be thrown from its seat 46 due to centrifugal force and the pressure in the chamber 54 thus allowing the pressure to fall within the chamber 24 and resulting in the striking head 18 moving rearwardly and the firing pin exploding the shell. The same result would occur should the projectile pass above a ship.

The amount of current which will be generated within the circuit will be dependent to some extent to the location of the earth's surface from which it is fired. I accordingly provide the variable resistance 38 through which the amount of current passing to the wire 47 may be controlled. The amount of current generated will also be effected by the rate of rotation of the projectile. Since the rotation will be variable falling off as the distance between the projectile and the gun increases, I provide the sliding resistance 70. This may be any type of centrifugal operated device but as shown I provide two resistances 71 and 72 between which the block 73 slides with a connecting wire 74 connecting the resistances 71 and 72. A spring 75 operating against the plugs 76 tends to keep the block 73 inwardly toward the center of the fuse, the resilience of the spring 75 is overcome by centrifugal force and the block 73 will slide against the projectile thus increasing the resistance. As the rotation of the projectile lessens, the block 73 will slide inwardly thus decreasing the effectiveness of the resistance.

From the foregoing it will be apparent that the explosion of a fuse can be fixed at a predetermined distance from a target so that the increased intensity of the magnetic field due to the resultant magnetic field of the target and earth will increase from 2½ to 5 percent the value of the normal magnetic field of the earth at that point. The temperature which is generated will lessen the tensile strength of the metal wire in a very small fraction of a second with the resultant explosion of the projectile. These factors can be so determined that the destruction of a plane may be assured either by the impact of shell fragments or the action of the shell blast.

With the use of such a shell it is possible to so adjust the dispersion of a projectile from a series of guns as to form an area within which destruction of a plane is almost certain. The shell may be used at sea against ships, superstructures of ships, or submarines and field artillery or any place where iron vehicles move. It will also be appreciated that the shell in its construction is less complicated and less expensive to manufacture than the intricate timing mechanism now in use.

As has been previously explained, I have demonstrated the use of my invention in connection with a projectile but its use is not limited to the ordnance field and the essential features of my invention resides in a control unit which employs the variance in magnetic fields to increase the temperature of a metallic strip with a resultant reduction in the tensile strength of that strip. It will be appreciated that this conceptive idea may be employed in many ways.

I claim:

1. The combination with a fuse of the supersensitive type having a striker head supported by air pressure, of means for releasing the air pressure behind said striker head, said means including a plug, a metallic strip holding said plug in place, a circuit connected with said strip, a coil in said circuit adapted to produce a current when rotated in the earth's magnetic field, said current raising said strip to a predetermined temperature when under the influence of the earth's magnetic field and causing said strip to fracture when an additional magnetic force is superimposed upon the earth's magnetic field.

2. A control instrument including a metal strip of the type characterized by a loss in tensile strength with a rise in temperature, a circuit connected to said strip, a coil in said circuit mounted on a soft iron core rotating through the earth's magnetic field and generating electric current by virtue of such rotation in said field thereby heating said strip, a centrifugally operated resistance in said circuit compensating for variations in the speed of rotation, said resistance moving in a circular path and being provided with tension means which yieldably oppose the centrifugal force thereby generated, means causing said strip to fracture when an additional magnetic field independent of said control instrument is super-imposed upon the earth's magnetic field thereby increasing the temperature in, and reducing the tensile strength of, the said strip to the breaking point.

PANAYOTTIS J. ELIOMARKAKIS.

REFERENCES CITED

The following references are of record in the file of this patent:

UNITED STATES PATENTS

| Number | Name | Date |
|---|---|---|
| 1,569,248 | Adelman | Jan. 12, 1926 |
| 1,379,972 | Fiske | May 31, 1921 |
| 600,051 | Whittingham | Mar. 1, 1898 |

FOREIGN PATENTS

| Number | Country | Date |
|---|---|---|
| 6,757 | Great Britain | Mar. 19, 1912 |
| 487,544 | Great Britain | June 22, 1938 |